United States Patent Office 3,259,970
Patented July 12, 1966

3,259,970
METHOD OF SUBMERGED ARC WELDING OF IRON AND STEEL USING NITRIDE PRODUCING MATERIALS
Sadayoshi Morita, Teiji Ito, Takeshi Nishi, and Shigeo Fujimori, Yawata, Japan, assignors to Yawata Iron & Steel Co., Ltd., Tokyo, Japan, a corporation of Japan
No Drawing. Filed Dec. 27, 1962, Ser. No. 247,492
Claims priority, application Japan, Dec. 29, 1961, 36/48,066
14 Claims. (Cl. 29—488)

This invention relates to a method of welding iron and steel by a submerged arc. By "submerged arc" is meant an arc submerged in slag formed by melted flux, and where used hereinafter it shall be taken in this sense.

Submerged arc welding method has the advantages that it is highly efficient and that beautifully welded parts can be obtained thereby. On the other hand, it has a drawback that the notch-toughness of the deposited metal resulting from the combination of the core wire and flux commonly in use today is very low. Such low notch-toughness of the deposited metal gives substantially no trouble where soft steel is being welded, but such low notch-toughness is not satisfactory in the welding of various low-temperature steel materials having a high notch-toughness which have recently become available. Therefore, research has been conducted looking to the improvement of core wires and fluxes, and special welding methods have been developed in many countries to accelerate the improvement of the notch-toughness of the deposited metal, but to date substaniatlly no satisfactory results have been obtained.

It has been recognized that generally the most effective way to improve the notch-toughness of the deposited metal has been to make the structure of the deposited metal fine and to carry out deoxidization and denitrogenation of the deposited metal.

An object of the present invention is to provide a submerged arc welding method by which is produced a deposited metal having a high notch-toughness.

It has now been found that if a core wire containing, in addition to the ordinary composition, one or more nitride-producing metallic elements or their alloys and, in some cases, one or more substances which discharge nitrogen when they are heated, and a flux which contains, in some cases, one or more substances which discharge nitrogen when they are heated, and/or one or more nitride-producing metals or alloys are used in welding a steel material by a submerged arc welding process, one or more of the nitrides of the said metals can be produced in the deposited metal and, if required, the said deposited metal part is heat-treated after welding, and a deposited metal part having a high notch-toughness will be obtained.

The nitride-producing metals are selected elements having a high affinity for oxygen and nitrogen and are taken from the group consisting of aluminum, titanium, zirconium, beryllium, niobium and vanadium, and alloys thereof.

Substances which discharge nitrogen when heated are such nitrides as, for example, manganese nitride and calcium nitride, and such nitrogen compounds as, for example, cyanides such as $Ca(CN)_2$. These substances decompose when they are hot and discharge nitrogen.

The core wire to be used in the method of the present invention should contain, in addition to the ordinary materials, one or more of the said nitride-producing metals and, in some cases, one or more of the said nitrogen-discharging substances. When making a core wire contain a nitrogen-discharging substance, it is preferable to make the core wire in the form of a tube and to put the said nitrogen-discharging substance into the hollow interior of the tubular core wire. Although the nitride-producing metal may be contained in the metal of the core wire, it is preferable to put such nitride-producing metal in a powdery form together with the nitrogen-discharging substance into the hollow interior of said tubular core wire.

A granular flux is used for submerged arc welding. In some cases, this flux can contain one or more granular or powdery nitride-producing metals and/or one or more nitrogen-discharging substances.

In any case, nitride-producing metals and nitrogen should be obtained either from the core wire on the flux, or both.

When welding a steel material by the submerged arc welding process and using the core wire and flux according to the present invention, the nitride-producing metal and the nitrogen-discharged from the nitrogen-discharging substance will react with each other to produce one or more of such nitrides as, for example, aluminum nitride, titanium nitride, zirconium nitride, beryllium nitride, niobium nitride and vanadium nitride, in the deposited metal during the coagulation of the deposited metal, and the said nitride will be deposited as a solid phase during coagulation or during an after-heat-treatment, such as, for example, normalizing, or depositing of further layers of metal by further welding. Therefore the structure of the deposited metal will be fine and the notch-toughness of the deposited metal part will be high.

The invention will now be explained in greater detail by means of the following examples.

*Example 1*

A silicon-manganese series steel material for use at low temperatures was welded with a submerged arc operated at 850 A. and 30 v. and moved along the steel material at 30 cm./min. to deposit a single layer weld while using a core wire having 2% Mn and 0.5 Mo and using a neutral flux. With these conditions, the best notch-toughness which this commercial core wires and fluxes can produce, is produced in a single layer weld. This is why a single layer weld was formed. The chemical composition of the commercial core wire and the impact strengths of the deposited metal were as given in Table 1.

TABLE 1.—CHEMICAL COMPOSITION AND IMPACT STRENGTHS OF A SINGLE LAYER WELD FORMED BY A SUBMERGED ARC USING COMMERCIAL CORE WIRE AND FLUX (PERCENTAGE WEIGHTS, BALANCE Fe)

| | |
|---|---|
| C | 0.13 |
| Si | 0.414 |
| Mn | 1.26 |
| P | 0.007 |
| S | 0.021 |
| Al | 0.014 |
| Mo | 0.26 |
| $N_2$ | 0.0059 |
| AlN | 0.010 |

IMPACT STRENGTHS AS WELDED

| | |
|---|---|
| VE 60° C., kg.-m./cm.$^2$ | 2.0 |
| VE 0° C. kg.-m./cm.$^2$ | 5.7 |
| VTr 15, °C | −40 |
| VTrS, °C | 5 |

TABLE 1—Continued
IMPACT STRENGTHS AFTER NORMALIZING AT 900° C. FOR 1 HOUR VE 0° C., kg.-m./cm.$^2$ _____ 32
VTr 15, ° C. _____ −10
VTrs, ° C. _____ >20

Thereafter, a like steel material was welded under the same conditions except that there was added to a bevel groove 0.02 to 0.20% aluminum plus nitrogen in the form of manganese nitride at various ratios from 1–4 times the amount of aluminum as measured by the atomic ratio. If more nitrogen than that is added, pores will be produced in the deposited metal. The commercial core wire had 0.13% C, 1.95% Mn, 0.03% Si, 0.03% P, 0.03% S and the rest was Fe, and a commercial neutral flux having 38.0% $SiO_2$, 7.20% MnO and 10.6% $Al_2O_3$, 25.3% CaO, 12.1% MgO and the rest impurities was used. The chemical compositions and impact strengths after the weld was normalized at 900° C. for 1 hour were as shown in Tables 2A and 2B.

TABLE 2A.—CHEMICAL COMPOSITIONS OF DEPOSITED METALS OBTAINED BY THE ALUMINUM NITRIDE ADDED SUBMERGED ARC-WELDING (PERCENTAGE WEIGHTS, BALANCE Fe)

| Al:N | C | Si | Mn | P | S | Al | $N_2$ | AlN | Amounts of manganese nitride in the flux |
|---|---|---|---|---|---|---|---|---|---|
| 1:1 | 0.13 | 0.40 | 1.28 | 0.008 | 0.018 | 0.050 | 0.0168 | 0.037 | 0.55 |
| 3:1 | 0.09 | 0.36 | 1.34 | 0.011 | 0.013 | 0.150 | 0.0136 | 0.035 | 0.55 |
| 3:2 | 0.09 | 0.35 | 1.48 | 0.012 | 0.013 | 0.140 | 0.0181 | 0.047 | 1.1 |
| 3:3 | 0.09 | 0.38 | 1.43 | 0.011 | 0.013 | 0.150 | 0.0228 | 0.058 | 1.6 |
| 3:4 | 0.09 | 0.37 | 1.61 | 0.011 | 0.013 | 0.150 | 0.0302 | 0.079 | 2.2 |
| 4:2 | 0.10 | 0.48 | 1.65 | 0.011 | 0.013 | 0.200 | 0.0182 | 0.040 | 1.1 |

TABLE 2B.—IMPACT STRENGTHS AFTER NORMALIZING at 900° C. for 1 hour

| Al:N | VE−60° C., Kg.-m./cm.$^2$ | VE 0° C., Kg.-m./cm.$^2$ | VTr 15, ° C. | VTrs, ° C. |
|---|---|---|---|---|
| 1:1 | 8.8 | 17.0 | <−60 | <−60 |
| 3:1 | 9.5 | 17.0 | <−60 | <−60 |
| 3:2 | 6.8 | 16.1 | <−60 | <−60 |
| 3:3 | 1.2 | 5.6 | −4.2 | >0 |
| 3:4 | 0.9 | 4.1 | −21 | >0 |
| 4:2 | 7.9 | 16.7 | <−60 | −50 |

It is thus seen that where aluminum and nitrogen were not added, the impact strength of the deposited metal at −60° C., was 2.3 kg.-m./cm.$^2$. Even after normalization, whereas, when the deposited metal having 0.05 to 0.20% aluminum and less than 0.02% nitrogen added was normalized, its impact strength was remarkably improved. This is because a large amount of aluminum nitride in the deposited metal was deposited by the heat-treatment and the structure was made fine. A great improvement in the impact strength of deposited metal as described above also resulted when a test piece of the deposited metal of a single layer weld was reproduced by heating the improved core rod and flux at 900 to 1000° C.

Example 2

The deposited metal of a multi-layer weld is also improved by the use of the method of this invention. A multilayer weld was formed by a submerged arc welding method and using a core wire and a flux similar to that in Example 1. The resulting composition and impact strengths are shown in Table 3.

TABLE 3.—CHEMICAL COMPOSITION AND IMPACT STRENGTHS OF THE DEPOSITED METAL OF A MULTI-LAYER WELD PRODUCED ALUMINUM NITRIDE ADDED SUBMERGED ARC WELDING (PERCENTAGE WEIGHTS, BALANCE Fe)

C _____ 0.11
Si _____ 0.450
Mn _____ 1.35
P _____ 0.009
S _____ 0.019
Al _____ 0.052
Mo _____ 0.32
$N_2$ _____ 0.0182
AlN _____ 0.036

IMPACT STRENGTHS AS WELDED

VE −60° C., kg.-m./cm.$^2$ _____ 7.5
VE 0° C., kg.-m./cm.$^2$ _____ 15.6
VTr 15, ° C. _____ <−60
VTr 5, ° C. _____ <−60

As in Example 1, the deposited metal in the multilayer weld is characterized by the presence of a large amount of the metallic nitride.

Thus when aluminum nitride is to be produced, the amount of nitrogen in deposited metal in the conventional submerged arc welding was only about 0.006%, as seen in Table 1, so that even if all such nitrogen formed aluminum nitride, it would be less than 0.020%. Therefore, even if a large amount of aluminum is added to the core wire or the flux, unless nitrogen is also added simultaneously, not only will the process fail to produce a large amount of aluminum nitride, but also excess aluminum will be oxidized and will leave such impurities as alumina in the deposited metal, will reduce silica in the flux, will dissolve a large amount of silicon in the deposited metal, and will therefore reduce the notch-toughness of the deposited metal. The same is true when titanium, zirconium, beryllium, niobium and vanadium are added to the core wire or flux.

Generally, the affinity of aluminum for nitrogen is lower than that of titanium and zirconium. Therefore, in order to elevate the notch-toughness of the deposited metal of a single layer weld, a heat-treatment after welding is required. However, for example, when 0.025 to 0.075% titanium and some nitrogen were added, even as welded, VE at −60° C. was 3.3 kg.-m./cm.$^2$, VE at 0° C. was 10.4 kg.-m./cm.$^2$, VTr 15 was lower than −60° C., and VTrs was 40° C., and thus considerably increased impact strengths were obtained. Even in the material after it was normalized at 900° C. for 1 hour, VE at −60° C. was 4.5 kg.-m./cm.$^2$, VE at 0° C. was 16.0 kg.-m./cm.$^2$, VTr 15 was lower than −60° C., and VTrs was −50° C., and thus the notch-toughness was further improved.

Example 3

A submerged arc single layer weld was produced under conditions similar to those of Example 1 with the combination of a hollow soft steel core wire chraged with aluminum and manganese nitride and a commercial neutral flux. The chemical composition of the deposited metal and its impact strengths after it had been normalized at 900° C. for 1 hour are shown in Table 4.

TABLE 4.—CHEMICAL COMPOSITION OF A SINGLE LAYER WELD PRODUCED BY A SUBMERGED ARC WELDING METHOD USING A HOLLOW CORE WIRE CHARGED WITH ALUMINUM AND MANGANESE NITRIDE AND A COMMERCIAL FLUX AND ITS IMPACT STRENGTHS AFTER NORMALIZING (PERCENTAGE WEIGHTS, BALANCE Fe)

| | |
|---|---|
| C | 0.09 |
| Si | 0.38 |
| Mn | 1.05 |
| P | 0.011 |
| S | 0.018 |
| Al | 0.062 |
| $N_2$ | 0.0152 |
| AlN | 0.030 |

IMPACT STRENGTHS AFTER NORMALIZING AT 900° C. FOR 1 HOUR

| | |
|---|---|
| VE 60° C., kg.-m./cm.$^2$ | 7.8 |
| VE 0° C., kg.-m./cm.$^2$ | 16.2 |
| VTr 15, ° C. | <−60 |
| VTrs, ° C. | <−60 |

As in the earlier examples the high nitride content of the deposited metal can be equally well produced with a hollow core wire containing the nitride producing metal and a nitrogen producing material. A high nitride content of the deposited metal can also be easily attained by using a combination of a core wire containing aluminum and a sintered flux having manganese nitride added to it.

*Example 4*

A singe layer weld was produced by a submerged arc welding process using a core wire containing aluminum and having the composition shown in Table 5 and a flux having manganese nitride added to it and having the composition as shown in Table 6. The chemical composition of the deposited metal and its impact strengths after it was normalized at 900° C. for 1 hour were as shown in Table 7.

TABLE 5.—CHEMICAL COMPOSITION OF THE CORE WIRE CONTAINING ALUMINUM (PERCENTAGE WEIGHTS, BALANCE Fe)

| | |
|---|---|
| C | 0.118 |
| Si | 0.03 |
| Mn | 1.64 |
| P | 0.011 |
| S | 0.016 |
| Al | 0.098 |
| Fe | Rem. |

TABLE 6.—COMPOSITION OF THE FLUX HAVING MANGANESE NITRIDE ADDED (PERCENTAGE WEIGHTS)

| | |
|---|---|
| $SiO_2$ | 35 |
| MnO | 10 |
| CaO | 25 |
| $Al_2O_3$ | 10 |
| MgO | 10 |
| Manganese nitride (nitrogen yield of 7%) | 5 |
| Others | 5 |

If a flux having a different composition is used, it must be such that the nitrogen yield is 7%.

TABLE 7.—CHEMICAL COMPOSITION OF THE SINGLE LAYER WELD PRODUCED BY A SUBMERGED ARC WITH A CORE WIRE CONTAINING ALUMINUM AND A FLUX HAVING MANGANESE NITRIDE ADDED TO IT AND ITS IMPACT STRENGTHS AFTER NORMALIZING (PERCENTAGE WEIGHTS)

| | |
|---|---|
| C | 0.06 |
| Si | 0.35 |
| Mn | 1.26 |
| P | 0.012 |
| S | 0.015 |
| Al | 0.045 |
| $N_2$ | 0.0150 |
| AlN | 0.035 |
| Fe | Rem. |

IMPACT STRENGTHS AFTER NORMALIZING AT 900° C. FOR 1 HOUR

| | |
|---|---|
| VE 60° C., kg.-m./cm.$^2$ | 6.8 |
| VE 0° C., kg.-m./cm.$^2$ | 16.1 |
| VTr 15, ° C | <−60 |
| VTrs, ° C | <−60 |

What is claimed is:

1. In a method of submerged arc welding of low temperature iron and steel materials having high notch-toughness, that improvement comprising using as the core rod and the flux a core rod and a flux at least one of which contains, in excess of the materials that are normally present, at least one nitride producing metal and at least one of which core rod and flux contains at least one material which discharges nitrogen when it is heated, whereby at least one nitride of the nitride producing metal is formed in the metal deposited during the welding.

2. The improvement as claimed in claim 1 in which the core rod contains at least one nitride producing metal and at least one material which discharges nitrogen when it is heated.

3. The improvement as claimed in claim 1 in which the flux contains at least one nitride producing metal and at least one material which discharges nitrogen when it is heated.

4. The improvement as claimed in claim 1 in which the core rod contains at least one nitride producing metal and the flux contains at least one nitrogen discharging material.

5. The improvement as claimed in claim 1 in which the core rod contains at least one nitrogen discharging material and the flux contains at least one nitride producing metal.

6. The improvement as claimed in claim 1 in which the said at least one nitride producing metal is a metal taken from the group consisting of aluminum, titanium, zirconium, berylium, niobium and vanadium, and alloys thereof.

7. The improvement as claimed in claim 1 in which the at least one material which discharges nitrogen is a material taken from the group consisting of nitrides and cyanides.

8. A core wire for use in a submerged arc welding process on low temperature iron and steel materials having high notch-toughness, said core wire containing, in excess of the materials that are normally present, at least one nitride producing metal, and at least one material which will discharge nitrogen when it is heated.

9. A core wire as claimed in claim 8 in which the nitride producing metal is a metal taken from the group consisting of (group from claim 6) and the nitrogen discharging material is a material taken from the group consisting of nitrides and cyanides.

10. A core wire for use in a submerged arc welding process on low temperature iron and steel materials having high notch-toughness, said core wire consisting essentially of 0.02 to 0.20% by weight of aluminum, manganese nitride in an amount of from 1–4 times the amount of aluminum as measured by the atomic ratio, 0.13% C, 1.95% Mn, 0.03% Si, 0.03% P, 0.03% S, all percentages being by weight, and the remainder Fe.

11. A core wire for use in a submerged arc welding process on low temperature iron and steel materials having high notch-toughness, said core wire consisting essentially of 0.098% Al, 0.118 C, 0.03% Si, 1.64% Mn, 0.011% P, 0.016% S, all percentages being by weight and the remainder Fe.

12. A flux for use in a submerged arc welding process on low temperature iron and steel materials having high notch-toughness, said flux containing, in excess of the materials that are normally present, at least one nitride producing metal and at least one material which will discharge nitrogen when it is heated.

13. A flux for use in a submerged arc welding process on low temperature iron and steel materials having high notch-toughness, said flux containing, in excess of the materials that are normally present, at least one material which will discharge nitrogen when it is heated.

14. A flux for use in a submerged arc welding process on low temperature iron and steel materials having high notch-toughness said flux consisting essentially of 35% $SiO_2$, 10% MnO, 25% CaO, 10% $Al_2O_3$, 10% MgO, 5% manganese nitride and the remainder impurities, all percentages being by weight.

References Cited by the Examiner
UNITED STATES PATENTS

| | | | |
|---|---|---|---|
| 2,121,055 | 6/1938 | Smith et al. | 75—125 |
| 2,909,642 | 10/1959 | Landis | 219—73 |
| 2,973,428 | 2/1961 | Pfeiffer et al. | 219—317 |
| 3,066,215 | 11/1962 | Espy | 219—74 |

WHITMORE A. WILTZ, *Primary Examiner.*

J. F. CAMPBELL, P. M. COHEN, *Assistant Examiners.*